(12) United States Patent
Terbu (10) Patent No.: US 11,396,269 B2
(45) Date of Patent: Jul. 26, 2022

(54) CURTAIN AIRBAG ASSEMBLIES FOR UTILITY VEHICLES

(71) Applicant: Autoliv ASP, Inc., Ogden, UT (US)

(72) Inventor: John Erik Terbu, Clinton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 16/849,807

(22) Filed: Apr. 15, 2020

(65) Prior Publication Data

US 2021/0323494 A1  Oct. 21, 2021

(51) Int. Cl.
| | |
|---|---|
| *B60R 21/232* | (2011.01) |
| *B60R 21/207* | (2006.01) |
| *B60R 21/231* | (2011.01) |
| *B60R 21/217* | (2011.01) |
| *B60R 21/00* | (2006.01) |

(52) U.S. Cl.
CPC .......... *B60R 21/232* (2013.01); *B60R 21/207* (2013.01); *B60R 21/2176* (2013.01); *B60R 21/23138* (2013.01); *B60R 2021/0074* (2013.01); *B60R 2021/23146* (2013.01)

(58) Field of Classification Search
None
See application file for complete search history.

(56) References Cited

U.S. PATENT DOCUMENTS

| | | | | |
|---|---|---|---|---|
| 3,804,435 A * | 4/1974 | See | ........................ | B60R 21/131 280/733 |
| 6,630,220 B1 * | 10/2003 | Veiga | ........................ | B32B 27/12 280/728.1 |
| 7,219,925 B2 * | 5/2007 | Hill | ........................ | B60R 21/055 280/730.1 |
| 7,690,684 B2 * | 4/2010 | Tobaru | .................... | B60R 21/13 280/756 |
| 8,322,749 B2 * | 12/2012 | Srabstein | ................ | B60R 21/13 280/756 |
| 8,925,961 B2 * | 1/2015 | Furusawa | ............. | B60R 21/213 280/730.2 |
| 9,205,797 B2 | 12/2015 | Ostman et al. | | |
| 9,963,102 B1 | 5/2018 | Ballam et al. | | |
| 10,315,608 B2 * | 6/2019 | Sadr | .................... | B60R 21/0428 |

(Continued)

FOREIGN PATENT DOCUMENTS

| | | | | | |
|---|---|---|---|---|---|
| CN | 109624809 A | * | 4/2019 | .............. | B60N 2/64 |
| DE | 102014010646 | | 12/2014 | | |
| JP | 07156733 | | 6/1995 | | |

OTHER PUBLICATIONS

International Search Report and Written Opinion dated Jul. 2, 2021 for international application PCT/US2021/027317.

*Primary Examiner* — Faye M Fleming
(74) *Attorney, Agent, or Firm* — Foley & Lardner LLP (57) ABSTRACT

An inflatable airbag assembly for a utility terrain vehicle (UTV) that includes an airtight housing to be mounted to a vehicle structure of the UTV, an inflator to generate inflation gas, and an inflatable airbag cushion disposed within the airtight housing that is in fluid communication with the inflator to receive the inflation gas and deploy from a packaged configuration within the airtight housing to a deployed configuration to protect an occupant of the UTV during a collision event. The UTV may comprise a plurality of inflatable airbag assemblies disposed in various locations on the UTV to help keep passengers and their appendages in the UTV.

20 Claims, 5 Drawing Sheets

(56) References Cited

U.S. PATENT DOCUMENTS

2005/0288626 A1    11/2005  Hill
2006/0138763 A1*    6/2006  Brady .................. B60R 21/231
                                                        280/756
2019/0366970 A1    12/2019  Wiscombe et al.

* cited by examiner

CURTAIN AIRBAG ASSEMBLIES FOR UTILITY VEHICLES

TECHNICAL FIELD

The present disclosure relates generally to the field of automotive protective systems for utility terrain vehicles (UTV). More specifically, the present disclosure relates to inflatable airbag cushion assemblies for UTVs.

BACKGROUND

Airbags are often mounted to a vehicle and deploy to limit or prevent an occupant from impacting vehicular structures and/or to limit or prevent an occupant from being ejected from a vehicle in a collision event, such as a rollover. Embodiments disclosed herein provide improvement in performance of inflatable airbag cushion assemblies.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

An airbag may also be referred to herein as a "cushion" and may refer to any inflatable safety device. The phrases "connected to" and "coupled to" are used in their ordinary sense, and are broad enough to refer to any suitable coupling or other form of interaction between two or more entities, including mechanical, fluid and thermal interaction. Two components may be coupled to each other even though they are not in direct contact with each other. The phrases "attached to" or "attached directly to" refer to interaction between two or more entities which are in direct contact with each other and/or are separated from each other only by a fastener of any suitable variety (e.g., mounting hardware or an adhesive). The phrase "fluid communication" is used in its ordinary sense, and is broad enough to refer to arrangements in which a fluid (e.g., a gas or a liquid) can flow from one element to another element when the elements are in fluid communication with each other.

Utility vehicles, such as side-by-side vehicles, cabin motorcycles, etc. are task-based vehicles that may be use on or off a highway. Side-by-side vehicles are small 2- to 6-person four-wheel drive off-road vehicles. Side-by-side vehicles are also known as UTVs (utility vehicle, utility task vehicle, or vehicle terrain vehicles), ROVs (recreational off-highway vehicle), or MOHUV (multipurpose off-highway utility vehicle).

Most UTVs are equipped with a roll-over protection system, such as a roll bar or a roll cage. A roll cage is a specially engineered and constructed frame built in or sometimes around the passenger compartment of a vehicle to protect its occupants from being injured or killed in a collision event, particularly in the event of a rollover. Due to the nature and design and use of UTVs, rollovers are highly probable and may result in crushed appendages of an occupant's body. For example, when a UTV rolls, the provided seat belts may not protect arms from leaving the roll cage and becoming pinched between the roll cage frame and another feature such as a tree, pole, building, etc., in geographic proximity. When a passenger is not belted, the passenger may be ejected from the UTV. Many UTVs also come equipped with hard tops, windshields, and safety nets. However, safety nets are not widely used due to restricted vision and inconvenience.

The present disclosure is directed to inflatable airbag systems that may be utilized with UTVs to help reduce or minimize occupant injury in a vehicle collision or rollover by keeping passengers within the safety of the roll cage. Inflatable airbag systems may be installed at various locations within the UTV, including, but not limited to, the steering wheel, the instrument panel, within the side doors or side seats, coupled to the roll cage, in an overhead position, or at the knee or leg position. In the following disclosure, "airbag" generally refers to an inflatable airbag or cushion.

The terms "rearward" and "forward" relate to the relative positions of the objects along the longitudinal direction. "Forward" relates to placement of an object relatively closer than a second object to a frontal plane of the vehicle. Similarly, "rearward" relates to placement of an object relatively closer than another object to a rear plane of the vehicle. An object that is "forward" of a second object need not be aligned with the second object in the longitudinal direction; it simply means that the first object is closer to the frontal plane of the vehicle than the second object. The term "rearward" similarly does not require alignment in the longitudinal direction.

Figure 1:
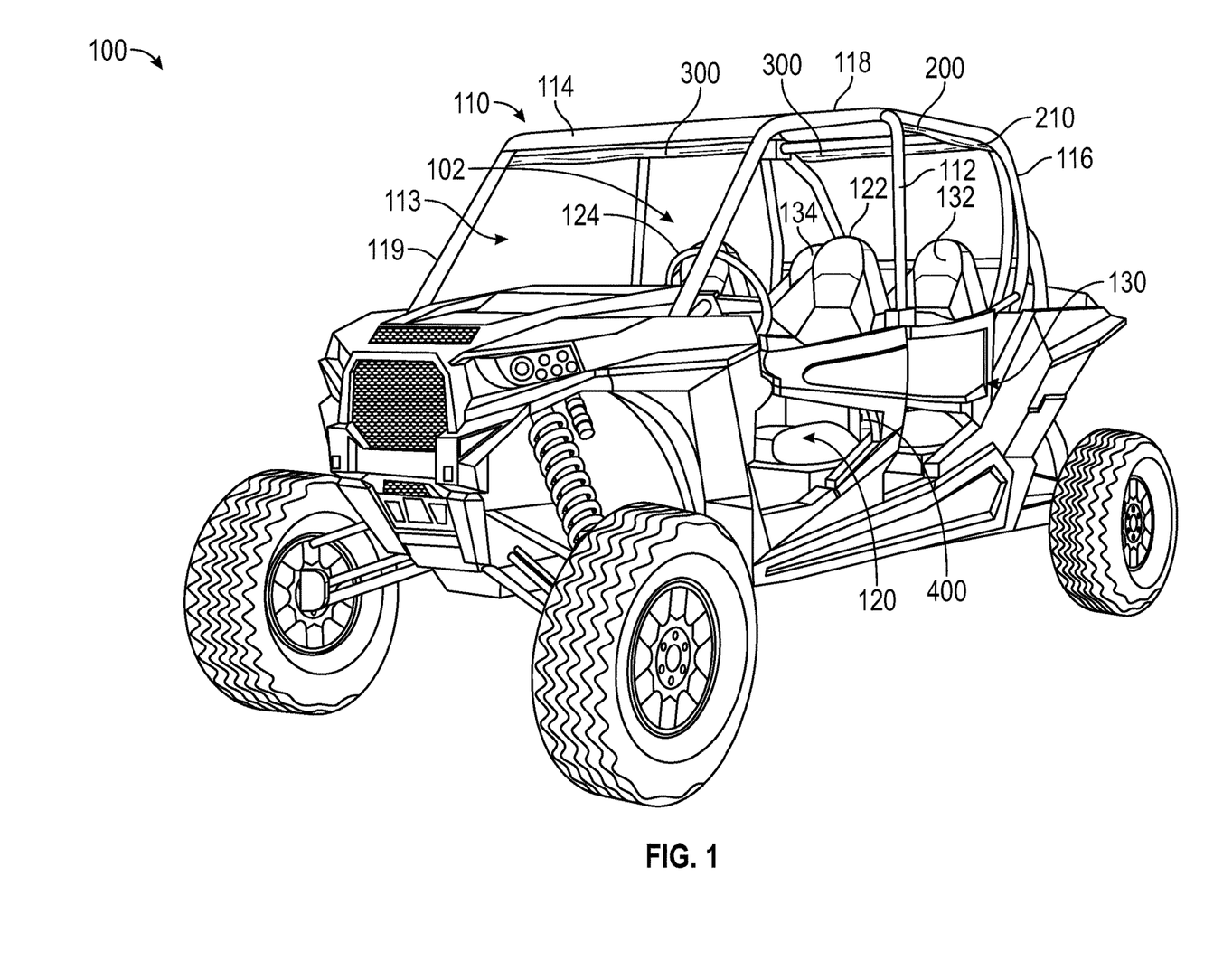
FIG. 1 is a perspective view of a utility terrain vehicle (UTV) in which any of a plurality of inflatable airbag cushion assemblies may be utilized.

FIG. 1 is a perspective view of a utility terrain vehicle (UTV) 100 that comprises a plurality of inflatable airbag assemblies. The UTV 100 may comprise a roll cage 110 that is a specially engineered and constructed frame built in or sometimes around a passenger compartment 102 of the UTV 100 to protect occupants within the passenger compartment 102 in the event of a collision event, and particularly in the event of a rollover. In the illustrated embodiments, the roll cage 110 may comprise a main roll bar 112, a front roll bar 114, a rear roll bar 116, and lateral connecting members 118, 119. The structure of the roll cage 110 is relatively open and forms a plurality of openings that enable occupants to have a view of the outdoors, especially when off-roading.

The present disclosure is not limited to the roll cage 110 illustrated in the figures. There may be a variety of different roll cages (the different roll cages may comprise a variety of different components than discussed below) which may be used for the illustrated UTV or for a variety of different UTVs, and the inflatable airbag cushions of the present disclosure may be implemented in a variety of different UTVs with a variety of different roll cages.

The main roll bar 112 is a structure comprising a near vertical frame and hoop located across the UTV 100 just behind a front row 120 of vehicle seating positions. The front row 120 of vehicle seating positions may include a driver seating position 122 and a passenger seating position 124. The main roll bar 112 may be fabricated from a metal, such as steel. In some embodiments, the main roll bar 112 may have a hollow structural section. In some embodiments, the main roll bar 112 may have a circular cross-section, a rectangular cross-section, and the like.

The rear roll bar 116 is similar to the main roll bar 112. The rear roll bar 116 is a structure comprising a near vertical frame and hoop located across the UTV 100 just behind a rear row 130 of vehicle seating positions 132, 134. In some embodiments, the UTV may not have a rear row of vehicle seating positions, and therefore the rear roll bar 116 may not be needed. The rear roll bar 116 may be fabricated from a metal, such as steel. In some embodiments, the rear roll bar 116 may have a hollow structural section. In some embodiments, the rear roll bar 116 may have a circular cross-section, a rectangular cross-section, and the like.

The lateral connecting members 118, 119 may be a pair of longitudinal members that extend the length of the UTV from a frontal end of the UTV 100 to a rear end of the UTV 100 and links the main roll bar 112 to the rear roll bar 116. The lateral connecting members 118, 119 may be parallel to each other over the longitudinal length of the UTV 100. The lateral connecting members 118, 119 may be disposed laterally outboard of the vehicle seating positions of both the front row 120 and rear row 130. The lateral connecting members 118, 119 may be fabricated from a metal, such as steel. In some embodiments, the lateral connecting members 118, 119 may have a hollow structural section. In some embodiments, the lateral connecting members 118, 119 may have a circular cross-section, a rectangular cross-section, and the like.

In the illustrated embodiments, the front roll bar 114 may be a connecting member that connects the lateral connecting members 118, 119. The front roll bar 114 may be disposed at a top of a windscreen 113 of the UTV 100. The front roll bar 114 may be fabricated from a metal, such as steel. In some embodiments, the front roll bar 114 may have a hollow structural section. In some embodiments, the front roll bar 114 may have a circular cross-section, a rectangular cross-section, and the like. In some embodiments, the front roll bar of a UTV may be similar to the main roll bar and comprise a vertical frame and hoop located in front of the front row of vehicle seating positions and may coincide with the windscreen 113 of the UTV.

The UTV 100 may be equipped with a variety of inflatable airbag assemblies. For example, the UTV 100 may comprise a curtain airbag assembly 200, a head airbag assembly 300, and a side airbag assembly 400. The curtain airbag assembly 200, the head airbag assembly 300, and the side airbag assembly 400 may be coupled to the vehicle structure, such as the roll cage 110, the vehicle seating positions 122, 124, 132, 134, and the like.

Figure 2:
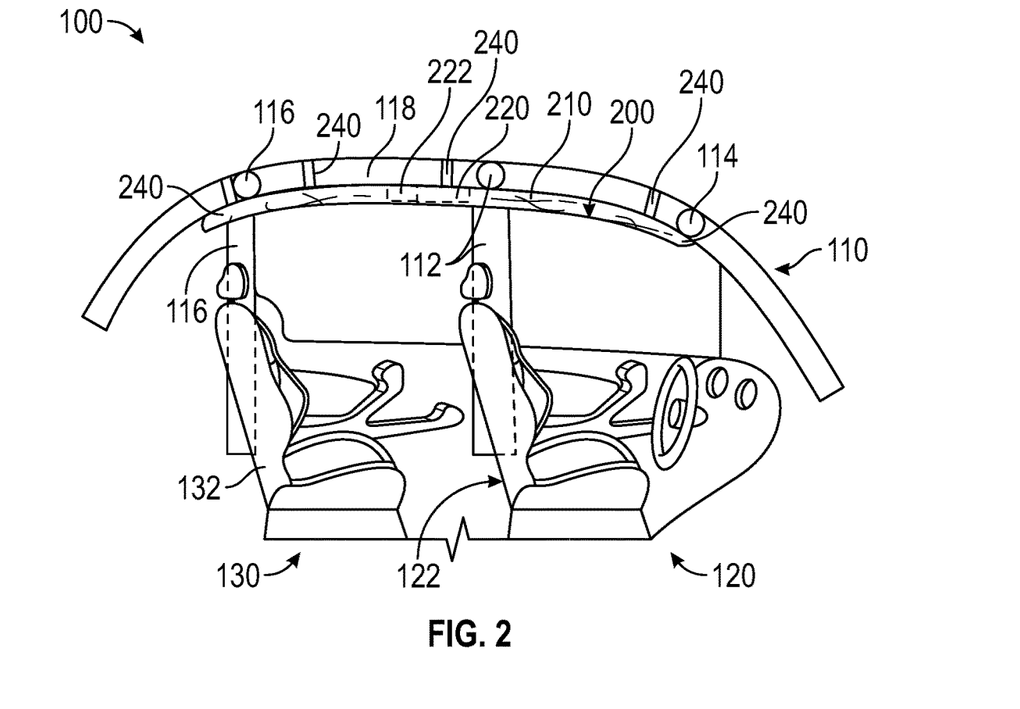
FIG. 2 is a side view of a UTV with a curtain airbag assembly in an undeployed configuration, according to one embodiment of the present disclosure.

FIG. 2 illustrates a side view of the UTV 100 with the curtain airbag assembly 200, according to one embodiment, in an undeployed configuration. The curtain airbag assembly 200 may include a housing 210, an inflator 220 to provide (e.g., generate) inflation gas, and an inflatable curtain airbag cushion 230 (shown in FIG. 3). The inflator 220 and the inflatable curtain airbag cushion 230 may be disposed within the housing 210. In some embodiments, the housing 210 is airtight. In some embodiments, the housing 210 is waterproof. In some embodiments, the housing 210 is weatherproof. Due to the nature of UTVs, the housing 210 is airtight in order to prevent natural elements such as water, humidity, dirt, and the like from entering the housing 210 and negatively impacting curtain airbag assembly 200 before deployment.

In some embodiments, the housing 210 may be a reinforcing wrapper or cover for holding the inflator 220 and the inflatable curtain airbag cushion 230 in a stable condition, under compression and with a reduced package size. The reinforcing wrapper is configured to encompasses the entire inflatable curtain airbag cushion 230. The reinforcing wrapper may include a longitudinally extending tear seam. The perforations of the tear seam may be tuned to control the timing and direction of the trajectory of the inflatable curtain airbag cushion 230 upon deployment. However, the tear seam limits or even prevents natural elements such as water, humidity, dirt and the like from entering the housing 210.

In some embodiments, a film may be coated onto the housing 210. The film may be a high density polyethylene/linear low-density polyethylene blend (HDPE/LLPE), or another similar material. The film thickness may be between 6 and 14 millimeters.

The reinforcing wrapper may be constructed of a non-woven fabric comprising a plurality of polymeric fibers. The non-woven fabric is provided in the form of a felt. An exemplary material considered particularly suitable for use with the present teaching is a polyester felt produced by a known needle technique in which a needling process is used to entangle and lock together the constituent polyester fibers of the material. In certain applications, the polyester fibers may be selected from a group consisting of polyethylene terephthalate (PET) fibers, co-polyethylene terephthalate (co-PET) fibers and combination thereof. Additional details regarding the material of the reinforcing wrapper may be found in U.S. Pat. No. 9,205,797, which is hereby incorporated by reference in its entirety.

The housing 210 of the curtain airbag assembly 200 may be secured to the UTV 100 using a securement mechanism 240 such as one or more straps, tethers, socks, sleeves, band clamps, fasteners, bolts, screws, or any other suitable securement mechanism. In some embodiments, the curtain airbag assembly 200 may be mounted to the roll cage 110. In the illustrated embodiment, the curtain airbag assembly 200 is coupled to a lower surface of the lateral connecting member 118 by securement mechanisms 240. The curtain airbag assembly 200 may also be coupled to an outer surface, an inner surface, or an upper surface of the lateral connecting member 118. The housing 210 of the curtain airbag assembly 200 may extend from the rear roll bar 116 to the front roll bar 114. In some embodiments, the curtain airbag assembly may extend from the front row 120 and the rear row 130. While not shown in FIG. 2, a curtain airbag assembly 200 may be coupled to the other lateral connecting member 119.

In some embodiments, the securement mechanism 240 may be a mounting tab assembly. The mounting tab assembly may include a bracket that is coupled to the roll cage 110. The bracket may be coupled to the roll cage 110 via a bolt, fastener, tethers, and the like. The inflatable curtain airbag cushion 230 may include multiple tabs disposed along the length of the inflatable curtain airbag cushion 230. Each end of each tab may be coupled to a top edge of the inflatable curtain airbag cushion 230. The bracket may include an aperture that enables the tab to go through the aperture to secure the inflatable curtain airbag cushion to the bracket. The tab may extend out of the housing 210 to loop through the aperture of the bracket and extend back into the housing 210.

With continued reference to FIG. 2, the inflator 220 may be positioned within a throat (not shown) of the inflatable curtain airbag cushion 230. The inflator 220 can be anchored to the lateral connecting member 118, and may be a pyrotechnic device, a stored gas inflator, or any variation and/or hybrid thereof. The inflator 220 may be in electronic communication with vehicle sensors, which are configured to detect vehicle collision events and/or rollovers. Upon detection of predetermined conditions, the sensors can activate the inflator 220 and the inflatable curtain airbag cushion 230 may be rapidly inflated. In some embodiments, the curtain airbag assembly 200 may not be in direct wired communication with the vehicle sensors. In such situations, the inflator 220 may communicate with the vehicle sensors via wireless communication or the curtain airbag assembly 200 may include a sensor 222 that is disposed within the housing 210. The sensor 222 may be a torque sensor, an accelerometer, a gyroscope, and the like. The sensor 222 may be able to detect a potential collision event or a rollover event. The inflator 220 is configured to generate inflation gas when the sensor 222 detects a predetermined threshold. The predetermined threshold may be set so that the curtain airbag assembly 200 does not deploy in a non-collision or a non-rollover situation, such as a sharp turn, driving up a steep incline, driving down a steep decline, and the like.

Figure 3:
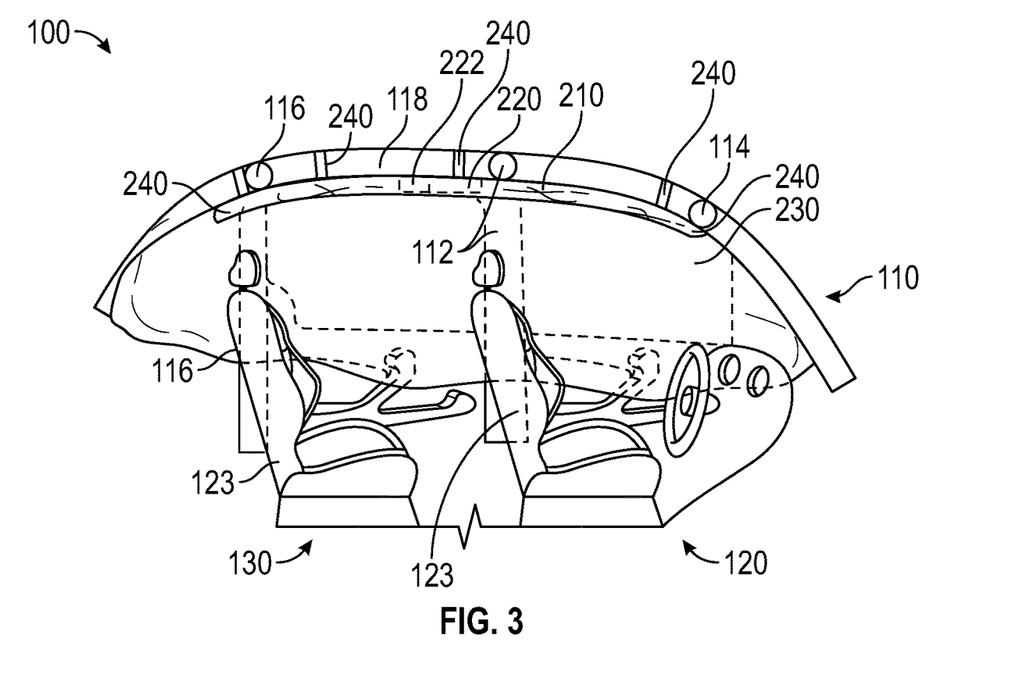
FIG. 3 is a side view of the UTV of FIG. 2 with the curtain airbag assembly in a deployed configuration.

FIG. 3 is a side view of the curtain airbag assembly 200 of FIG. 2 with an inflatable curtain airbag cushion 230 in a deployed configuration. The inflatable curtain airbag cushion 230 may deploy downward from the housing 210. In some embodiments, the airbag cushion 230 deploys through a longitudinally extending tear seam. The inflatable curtain airbag cushion 230 may extend longitudinally from in front of the front roll bar 114 to behind the rear roll bar 116, and vertically from the lateral connecting member 118 to below the top of a seat back 123 of the vehicle seating positions 122, 124, 132, 134. In some embodiments, the inflatable curtain airbag cushion 230 is configured to extend at least past the opening (e.g., windows) of the front door and the rear door. The inflatable curtain airbag cushion 230 can be configured to cover various structures of the UTV 100 when deployed to help prevent the occupants from impacting some of the vehicle structures. For example, in some embodiments, at least a portion of the deployed inflatable curtain airbag cushion 230 may cover some or all of one or more of the main roll bar 112 and the rear roll bar 116.

The inflatable curtain airbag cushion 230 may be formed of one or more panels forming a plurality of inflatable chambers of different thicknesses that provide a level of cushioning corresponding to the thickness. In particular, the inflatable curtain airbag cushion 230 can include one or more various inflatable chambers, cells, cushion segments, or cushion areas that are configured to be filled with inflation gases in order to cushion a vehicle occupant during a collision event. The inflatable chambers can be configured to deploy at strategic areas so as to cushion anatomical structures of a vehicle occupant. The inflatable chambers may be in fluid communication with an inflation gas delivery channel.

In some embodiments, the inflatable curtain airbag cushion 230 of FIG. 3 can include one or more zero thickness zones, one or more of which may be positioned between adjacent inflatable chambers. The zero thickness zones can be separated from the inflatable chambers at one or more boundary seams. The zero thickness zones and/or boundary seams may be formed by stitches, welds (e.g., radiofrequency welds), adhesives, and/or any other suitable technique or apparatus. For example, the zero thickness zones may be a single layer of woven material formed via a one-piece weaving technique. In other embodiments, the zero thickness zones may join together two or more pieces of material. In some embodiments, the zero thickness zones are substantially airtight and/or non-inflatable. In other embodiments, one or more of the zero thickness zones may be replaced by a minimally inflatable zone, which may have a thickness that is narrower than adjacent zones, and specifically narrower than the adjacent inflatable chambers.

The shapes of the inflatable curtain airbag cushion 230 and its various components that are depicted in FIG. 3 are not necessarily limiting. These shapes may be altered, such as to accommodate differently shaped UTVs.

The inflatable curtain airbag cushion 230 of FIG. 3 may include a pair of panels (e.g., an inboard panel and an outboard panel) formed from a contiguous piece of material manufactured using a one-piece woven technique. Other embodiments may be manufactured by cutting and sewing or otherwise connecting separate pieces of material (e.g., nylon fabric) together. For example, an inboard panel and an outboard panel may be formed from separate sheets of material and joined together such as by stitching, welding, gluing, or the like to form the inflatable curtain airbag cushion 230.

The inflatable curtain airbag cushion 230 of FIG. 3 can provide protection to passengers of a vehicle during an oblique collision, a side collision, or a rollover collision. The inflatable curtain airbag cushion 230 could provide a barrier between the occupants and the outside of the roll cage 110. In other words, the inflatable curtain airbag cushion 230 could contain the occupant within the roll cage 110 and prevent appendages of the occupants from protruding outside of the roll cage 110. The arrangement of zero thickness zones and inflatable chambers can allow the inflatable curtain airbag cushion 230 to provide a desired amount of protection to a vehicle occupant. For example, the zero thickness zones can be arranged so that the airbag can manage the rotational velocity of a head of the vehicle occupant.

Figure 4:
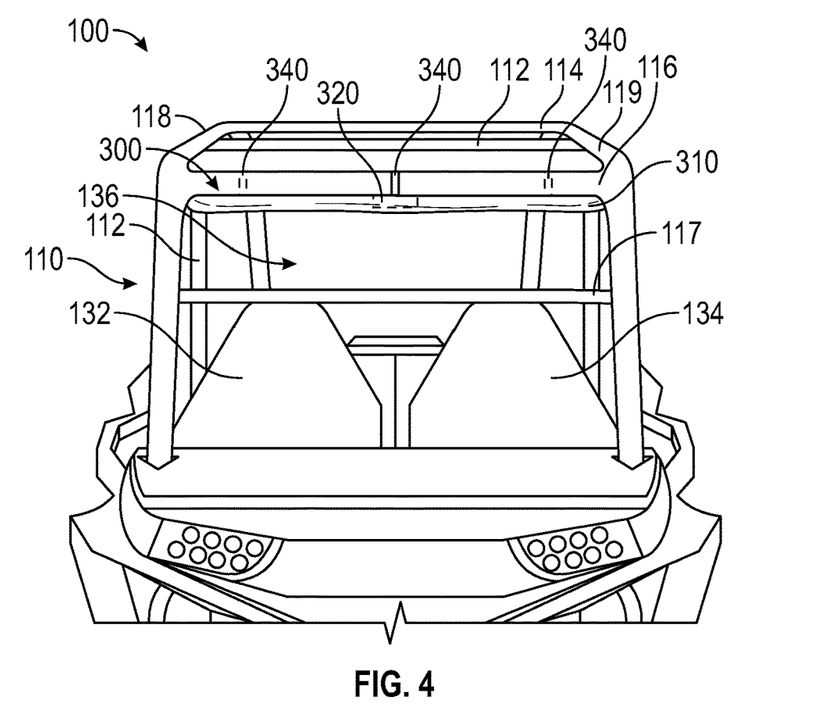
FIG. 4 is a rear view of a UTV with a head airbag assembly in an undeployed configuration, according to one embodiment of the present disclosure.

FIG. 4 is a rear view of the UTV 100 with the head airbag assembly 300 in a packaged and undeployed configuration. The head airbag assembly 300 may include a housing 310, an inflator 320 to provide inflation gas, and an inflatable head airbag cushion 330 (shown in FIG. 5). The inflator 320 and the inflatable head airbag cushion 330 may be disposed within the housing 210 in a packaged and undeployed configuration. The inflatable head airbag cushion 330 may be rolled or folded into a compact state to fit within the housing 310 in the packaged and undeployed configuration.

In some embodiments, the housing 310 is airtight. In some embodiments, the housing 310 is waterproof. In some embodiments, the housing 310 is weatherproof. Due to the nature of UTVs, the housing 310 is airtight to prevent natural elements such as water, humidity, dirt, and the like from entering the housing 310 and negatively impacting the head airbag assembly 300 during deployment of the inflatable head airbag cushion 330. The housing 310 may be a reinforcing wrapper or cover constructed of a non-woven fabric comprising a plurality of polymeric fibers.

As discussed above, in some embodiments, a film may be coated onto the housing 310. The film may be a high density polyethylene/linear low-density polyethylene blend (HDPE/LLPE), or another similar material. The film thickness may be between 6 and 14 millimeters.

The head airbag assembly 300 may be coupled to the roll cage 110. The head airbag assembly 300 may be coupled to a portion of the roll cage 110 so that the head airbag assembly 300 extends laterally between the lateral connecting member 118 and the lateral connecting member 119. In some embodiments, the head airbag assembly 300 is coupled to the main roll bar 112. In some embodiments, the head airbag assembly 300 is coupled to the rear roll bar 116. In some embodiments, the head airbag assembly 300 is coupled to the front roll bar 114. In some embodiments, a head airbag assembly 300 may be coupled to the main roll bar 112, another head airbag assembly 300 may be coupled to the rear roll bar 116, and another head airbag assembly 300 may be coupled to the front roll bar 114.

The housing 310 of the head airbag assembly 300 may be coupled to the main roll bar 112 or the rear roll bar 116 by a securement mechanism 340, such as one or more straps, tethers, socks, sleeves, band clamps, fasteners, screws, mounting tab assembly, or any other suitable securement mechanism. In the illustrated embodiment, the head airbag assembly 300 is coupled to the rear roll bar 116 by band clamps.

Figure 5:
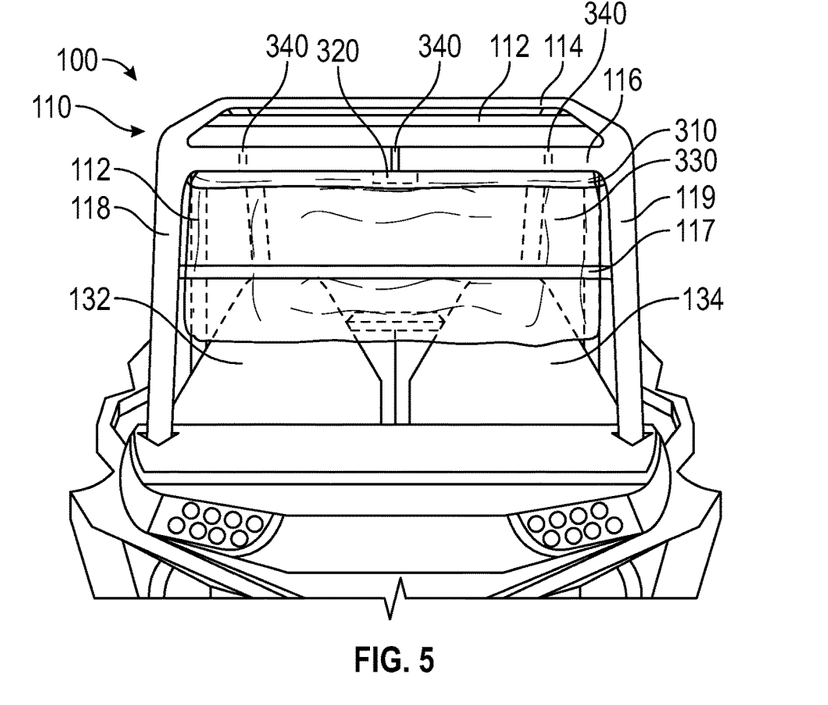
FIG. 5 is a rear view of the UTV of FIG. 4 with the head airbag assembly in a deployed configuration.

FIG. 5 is a rear view of the UTV 100 with the head airbag assembly 300 in a deployed configuration. The head airbag assembly 300 is configured to deploy downward from within the housing 310. In some embodiments, the airbag cushion 330 deploys through a longitudinally extending tear seam. The inflatable head airbag cushion 330 in the deployed configuration is configured to extend laterally from the lateral connecting member 118 to the lateral connecting member 119 and extend vertically from the rear roll bar 116 to the below and behind the top of the vehicle seating positions 132, 134. The deployed inflatable head airbag cushion 330 is disposed in front of a rear connecting member 117. The rear connecting member 117 couples to and extends between the lateral connecting member 118 and the lateral connecting member 119. Accordingly, the inflatable head airbag cushion 330 in the deployed configuration closes an opening 136 at the rear of the UTV to help prevent passengers from being ejected from the UTV or appendages of passengers from exiting the UTV during a vehicle collision event. In addition, the inflatable head airbag cushion 330 can provide some padding against the rear connecting member 117.

As discussed above, the inflatable head airbag cushion 330 may be similar to the inflatable curtain airbag cushion 230, in which the inflatable head airbag cushion 330 may comprise a plurality of chambers and a plurality of zero thickness zones.

In some embodiments, the head airbag assembly 300 may be coupled to the main roll bar 112 instead of or in combination with the head airbag assembly 300 being coupled to the rear roll bar 116. In a deployed configuration, the inflatable head airbag cushion 330 is configured to extend laterally between the lateral connecting member 118 and the lateral connecting member 119 and extend vertically from the main roll bar 112 to below and behind the top of the vehicle seating positions 122, 124 (see FIG. 1). The inflatable head airbag cushion 330 is configured to close an opening between the front row 120 (see FIGS. 2 and 3) and the rear row 130 (see FIGS. 2 and 3) of the UTV.

In some embodiments, the head airbag assembly 300 may be coupled to the front roll bar 114 instead of or in combination with the head airbag assembly being coupled to main roll bar 112, and the rear roll bar 116. In a deployed configuration, the inflatable head airbag cushion 330 is configured to extend laterally between the lateral connecting member 118 and the lateral connecting member 119 and extend vertically from the front roll bar 114 to an instrument panel. Accordingly, the inflatable head airbag cushion 330 in the deployed configuration closes the windscreen 113 (see FIG. 1) at the front of the UTV to help prevent passengers from being ejected from the UTV or appendages of passengers from exiting the UTV during a vehicle collision event.

Figure 6:
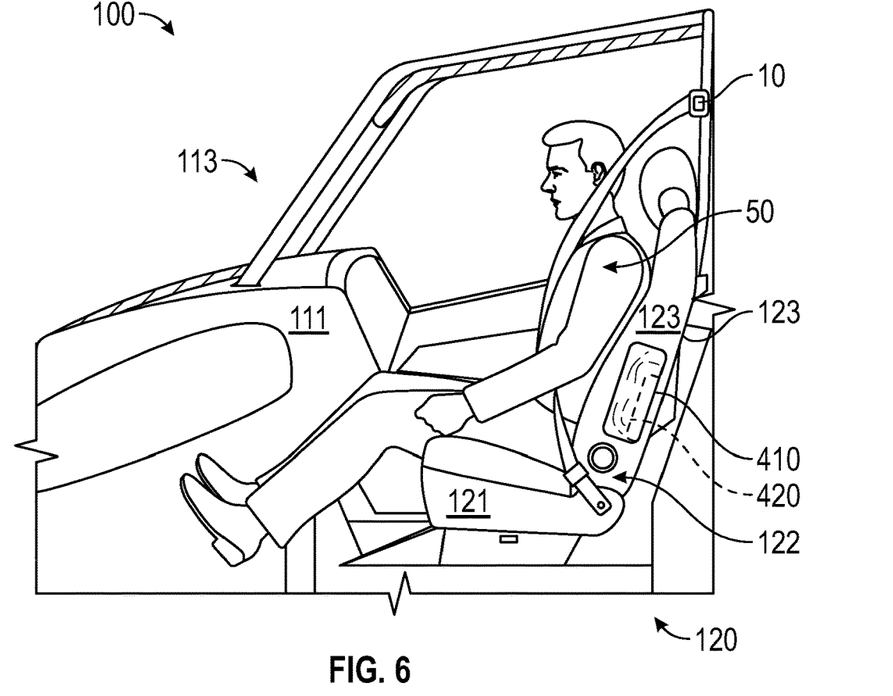
FIG. 6 is a side view of a UTV with a side airbag assembly in an undeployed configuration, according to one embodiment of the present disclosure.

FIG. 6 is a side view of an interior of the front row 120 of the UTV 100 with the side airbag assembly 400 in a packaged and undeployed configuration. A dashboard (or instrument panel) 111 and the windscreen 113 are shown for reference. An occupant 50 is shown in the driver seating position 122 in a seated and upright position. FIG. 6 illustrates the driver seating position 122; however, embodiments of the disclosures herein may be suitable for other vehicle seating positions within the UTV 100, such as the passenger seating position 124 and the passenger seating positions 132, 134 in the rear row 130 of the UTV 100. The driver seating position 122 may include an occupant seat 121, a seat back 123, and a restraint harness 10. The side airbag assembly 400 is mounted at an outboard portion of the seat back 123. The side airbag assembly 400 may include a housing 410, an inflator 420, and an inflatable side airbag cushion 430 (shown in FIG. 7). In some embodiments, the housing 410 is airtight. In some embodiments, the housing 410 is waterproof. In some embodiments, the housing 410 is weatherproof. Due to the nature of UTVs, the housing 410 is airtight in order to prevent natural elements such as water, humidity, dirt, and the like from entering the housing 410 and negatively impacting the side airbag assembly 400 before deployment. The housing 410 may be a reinforcing wrapper or cover constructed of a non-woven fabric comprising a plurality of polymeric fibers.

As discussed above, in some embodiments, a film may be coated onto the housing 410. The film may be a high density polyethylene/linear low-density polyethylene blend (HDPE/LLPE), or another similar material. The film thickness may be between 6 and 14 millimeters.

The housing 410 may be coupled to the outboard side of the seat back 123. In some embodiments, the housing 410 may be disposed within the seat back 123 but near the outboard side of the seat back 123.

The inflator 420 may be an appropriate airbag inflator for the purpose of inflating the inflatable side inflatable cushion 430. The inflator 420 can include a gas canister, a chemical container, or other method for generation of inflation gas, and any conduit(s) or ducting (plumbing) for delivering inflation gas to the inflatable side airbag cushion 430, and other components related to generation and delivery of inflation gas.

The inflatable side airbag cushion 430 is in an uninflated, undeployed, compressed configuration within the housing 410. The inflatable side airbag cushion 430 may be torso side airbag. For example, the inflatable side airbag cushion 430 may be folded or rolled into a compressed configuration. The inflatable side airbag cushion 430 may be formed from one or more panels of suitable material by means of cutting, folding, bending, turning or otherwise shaping such material, and by application of seams at appropriate locations. Seams may be formed by sewing, gluing, taping, radio frequency (RF) welding, or any other suitable means. Seams may be gas impermeable, semipermeable, or permeable, as appropriate. The inflatable side airbag cushion 430 may be configured to receive inflation gas from the inflator 420 to expand the inflatable side airbag cushion 430 from a packaged configuration within the housing 410 to a deployed configuration.

Figure 7:
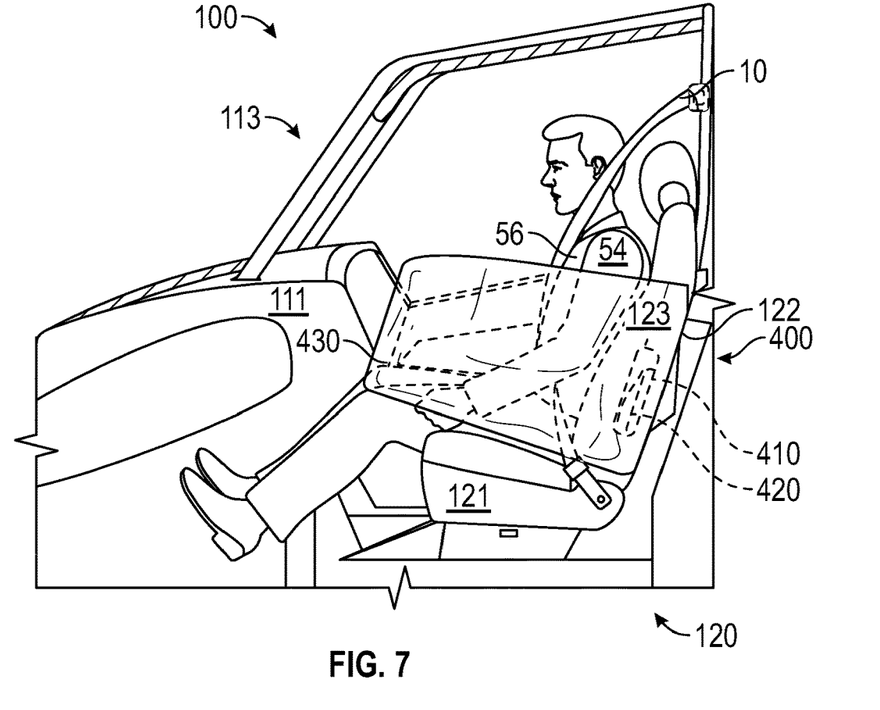
FIG. 7 is a side view of the UTV of FIG. 6 with the side airbag assembly in a deployed configuration.

FIG. 7 is a side view of the interior of the UTV 100 having the side airbag assembly 400, with an inflatable side airbag cushion 430 in a deployed configuration and at least partially inflated, and with the occupant 50 seated in an upright position in the driver seating position 122. The inflator 420 has activated and caused the inflatable side airbag cushion 430 to at least partially inflate and to deploy from the housing 410 to a position approximately lateral to the occupant 50.

As discussed above, the inflatable side airbag cushion 430 may be similar to the inflatable curtain airbag cushion 230, in which the inflatable side airbag cushion 430 may comprise a plurality of chambers and a plurality of zero thickness zones.

With the inflatable side airbag cushion 430 deployed, the inflatable side airbag cushion 430 may be configured to receive at least a portion of a torso 56 of the occupant 50 as the occupant 50 moves from the driver occupant position 122. In the embodiment of FIG. 7, the shoulder 54 of the occupant 50 may be above the height of the inflatable side airbag cushion 430. A configuration such as that shown in FIG. 7 may be particularly suited to use in the UTV having the inflatable curtain airbag cushion 230 (not shown in FIG. 7) such that the inflatable side airbag cushion 430 and the inflatable curtain airbag cushion 230 do not interfere with each other, but, rather, augment each other.

Figure 8:
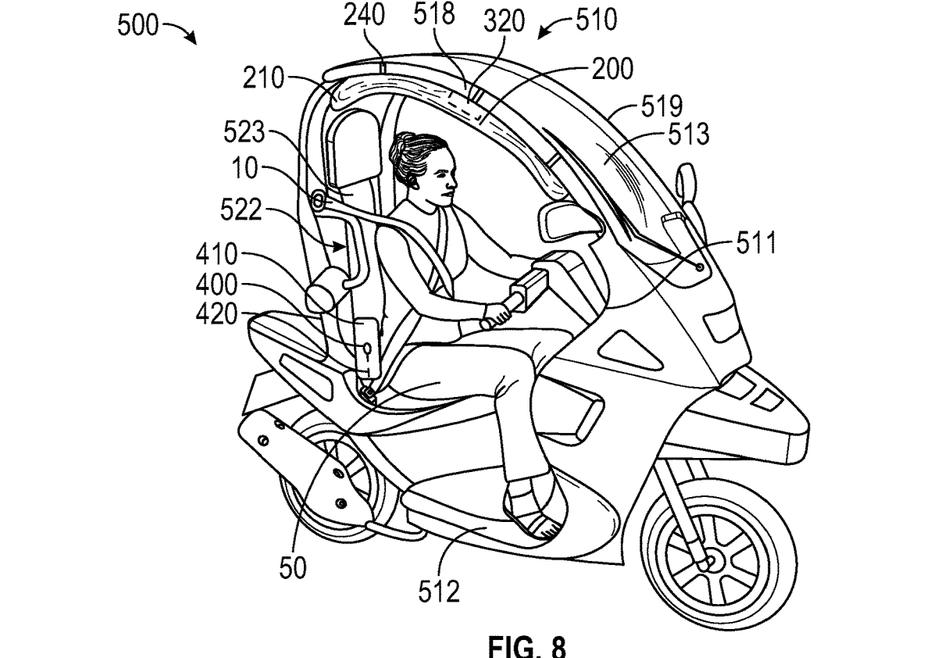
FIG. 8 is a perspective view of a cabin motorcycle with a curtain airbag assembly and a side airbag assembly in undeployed configurations, according to one embodiment of the present disclosure.

The inflatable airbag cushion assemblies discussed above may also be used in utility vehicle environments other than UTVs. For example, the inflatable airbag cushion assemblies discussed above may be used in a cabin motorcycle environment, such as fully enclosed or semi-enclosed cabin motorcycles. FIG. 8 illustrates a perspective view of a semi-enclosed cabin motorcycle 500 with a roof 510 and a windscreen 513. The roof 502 may include lateral connecting members 518 and 519 with the windscreen 513 disposed between. The semi-enclosed cabin motorcycle 500 may include a driver seating position 522, which may be similar to a seat in a motor vehicle. The cabin motorcycle 500 may include openings on both sides of the driver seating position 522.

The cabin motorcycle 500 may include inflatable airbag cushion assemblies similar to the inflatable airbag cushion assemblies discussed above in regard to UTVs to help prevent a driver 50 from being ejected from the cabin motorcycle 500 during a vehicle collision event or prevent an appendage of the driver from exiting the driver seating position 522. For example, the cabin motorcycle 500 may include a plurality of curtain airbag assemblies 200, with one curtain airbag assembly coupled to the lateral connecting member 518 and another curtain airbag assembly 200 coupled to the lateral connecting member 519. The curtain airbag assemblies 200 may be coupled to the lateral connecting members 518 and 519 by securement mechanisms 240. The curtain airbag assembly 200 includes the housing 210, the inflator 220, and the inflatable curtain airbag cushion 230, as previously discussed. FIG. 8 illustrates one curtain airbag assembly 200 in an undeployed configuration.

The cabin motorcycle 500 may include a plurality of side airbag assemblies 400. The driver seating position 522 may include a side airbag assembly 400. For example, the side airbag assembly 400 may be coupled to one side of a seat back 523 and another side airbag assembly 400 may be coupled to the opposite side of the seat back 523. In some embodiments, the side airbag assembly 400 may be disposed within the seat back 523 but on both sides of the seat back 523 of the driver seating position 522. The side airbag assemblies 400 may include the housing 410, the inflator 420, and the inflatable side airbag cushion 430 as previously discussed. FIG. 8 illustrates one side airbag assembly 400 in an undeployed configuration.

Figure 9:
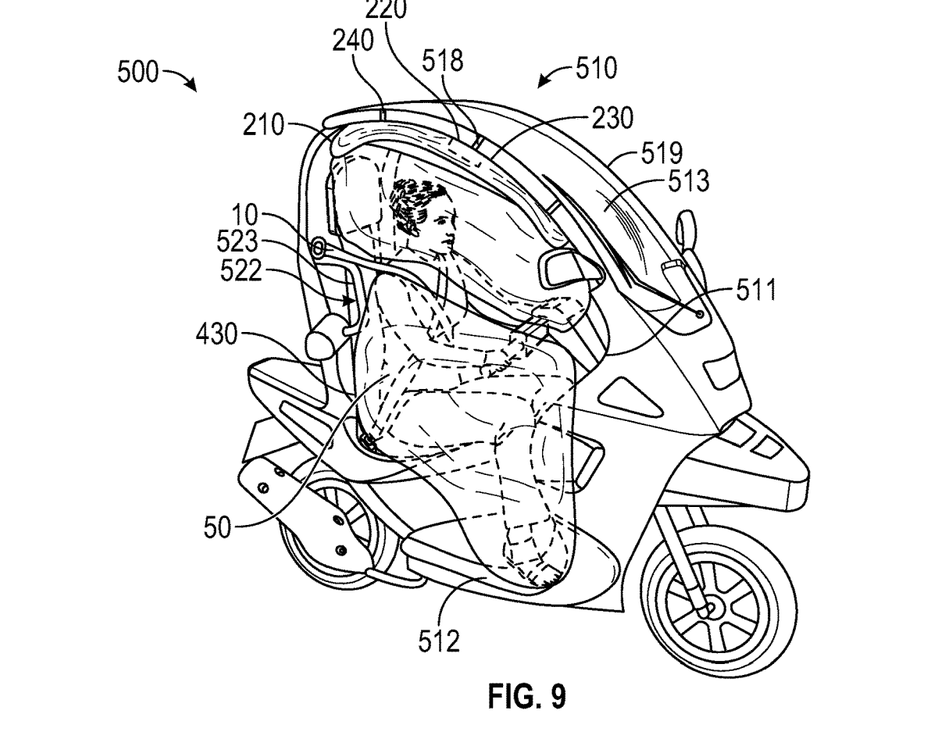
FIG. 9 is a perspective view of the cabin motorcycle of FIG. 8 with the curtain airbag assembly and the side airbag assembly in deployed configurations.

FIG. 9 illustrates a perspective view of the semi-enclosed cabin motorcycle 500 with the curtain airbag assembly 200 and the side airbag assembly 400 in deployed configurations. The inflatable curtain airbag cushion 230 is configured to deploy downward from within the housing 210. The inflatable curtain airbag cushion 230 may extend from a rear of the cabin motorcycle 500 to a front of the cabin motorcycle 500 and extend downward at least past the top of the seat back 523 of the driver seating position 522. The inflatable side airbag cushion 430 is configured to deploy forward, upward, and downward. The inflatable side airbag cushion 430 may extend in the deployed state from the seat back 523 to an instrument panel 511 of the cabin motorcycle 500 and extend from a footrest 512 up to at least the seat back 523 of the driver seating position 522. In some embodiments, the inflatable side airbag cushion 430 extends upwards and meets the inflatable curtain airbag cushion 230 extending downward.

The inflatable curtain airbag cushion 230 and the inflatable side airbag cushion 430 act in tandem to close off the opening on either side of the driver seating position 522 and do not interfere with each other. In this manner, the inflatable curtain airbag cushion 230 is able to receive the head of the driver 50 and the inflatable side airbag cushion 430 is able to receive at least a portion of the torso 56 of the driver 50 as the driver moves from the driver seating position 522.

In accordance with a method of the present disclosure, the inflatable airbag assemblies 200, 300, and 400 may be prepared for shipment and/or installation in the UTV 100. In this regard, inflatable airbag assemblies 200, 300, and 400 may be imparted with a stable shape having a reduced packaged shape having a reduced packaged size that can be airproof, waterproof, and/or weatherproof. In a first general step, the housing 210, 310, 410 (e.g., the reinforcing wrapper) is coupled to the inflatable airbag cushion 230, 330, 430 proximate a first longitudinally extending edge of the inflatable airbag cushion 230, 330, 4430, for example.

In a second general step, an intermediate package is prepared, in which the housing 210, 310, 410 entirely surrounds a periphery of at least a first portion of the inflatable airbag cushion 230, 330, 430. The inflatable airbag cushion 230, 330, 430 may be rolled and/or folded. The intermediate package is created by rolling the inflatable airbag cushion 230, 330, 430 about a longitudinal axis which is parallel to a longitudinal axis of the inflatable airbag cushion 230, 330, 430. The inflatable airbag cushion 230, 330, 430 may be rolled with an automated rolling machine about the longitudinal axis of the inflatable airbag cushion 230, 330, 430. In applications where a mandrel is used, the mandrel may be subsequently withdrawn from the resulting package. In other embodiments, however, the intermediate package can be formed by folding the inflatable airbag cushion 230, 330, 430, or by creating two or more rolls in the inflatable airbag cushion 230, 330, 430, or even by a combination of rolling and folding of the inflatable airbag cushion 230, 330, 430.

In accordance with the present disclosure, the roll process of the inflatable airbag cushion 230, 330, 430 is initiated and, where an adhesive covered by a paper backer is used, continued until the inflatable airbag 230, 330, 430 is almost completely rolled about the longitudinal axis of the inflatable airbag 230, 330, 430. When the inflatable airbag cushion 230, 330, 430 reaches the last approximately 360 degrees of rolling, for example, the removable paper backer of the housing 210, 310, 410 may be removed to expose the adhesive. Continued rolling of the inflatable airbag cushion 230, 330, 430 peripherally wraps the housing 210, 310, 410 completely about the rolled inflatable airbag cushion 230, 330, 430.

The inflatable airbag cushion 230, 330, 430 and the housing 210, 310, 410 cooperate to define a monotonously rolled portion of the inflatable airbag assemblies 200, 300, 400. Explaining further, the inflatable airbag cushion 230, 330, 430 and the housing 210, 310, 410 define a continuous coil extending from the second longitudinally extending side of the inflatable airbag cushion 230, 330, 430 to a free side of the inflatable airbag cushion 230, 330, 430. The second longitudinally extending side of the inflatable airbag 230, 330, 430 is at a center of the monotonously rolled portion of the airbag assemblies 200, 300, 400. The continuously coiled and monotonously rolled portion of the airbag assemblies 200, 300, 400 resultantly include an innermost portion defined by the inflatable airbag cushion 230, 330, 430, an outermost portion defined by the housing 210, 310, 410, and an intermediate portion defined by the housing 210, 310, 410 and the intermediate portion defined by an overlapping area of the inflatable airbag cushion 230, 330, 430 and the housing 210, 310, 410.

In a third general step, the intermediate package formed by rolling the inflatable airbag cushion 230, 330, 430 and the housing 210, 310, 410 is heated to melt or soften the material of the housing 210, 310, 410. In this regard, the housing 210, 310, 410 may be heated to a temperature that is above some of the melting point of some of the fibers of the housing 210, 310, 410 and below the melting point of other of the fibers. In one application, the intermediate package is placed within a nest or mold cavity of a pressing tool, heated to a predetermined temperature (e.g., at least 150 degrees C.). The nest of the pressing tool may be transferred by robot or otherwise to an infrared (IR) oven. In this particular application, the intermediate package may be heated during a dwell time of approximately 30 second. As discussed above, in some embodiments a HDPE/LLPE blend film may be coating onto the housing 210, 310, 410 before the intermediate package is heated.

The nest may be defined by a first or lower nesting member that cooperates with a second or upper nesting member. The nesting members may be configured in any desired shape for producing a desired profile to meet UTV packaging requirements. For example, for extending along a length of the lateral connecting member 118, 119 or a length of a roll bar 112, 114, 116.

The nest of the pressing tool with heated intermediate package may be transferred by robot or otherwise to the pressing tool. In a fourth general step, the pressing tool is actuated while the intermediate package remains heated from the IR oven. In other applications, the intermediate package may be simultaneously heated and pressed (i.e., heated while in the pressing tool). Regardless, the material of the housing 210, 310, 410 is sufficiently heated to allow the pressing tool to conform the intermediate packaged into the three-dimensional shape defined by the shape of the mold cavity of the first nesting member and the profile of the undersurface of the second nesting member.

In a fifth general step, the pressing tool compresses the intermediate package such that the inflatable airbag cushion 230, 330, 430 is under compression and has a reduced package size. Application of pressure to the heated intermediate package plastically deforms the housing 210, 310, 410 and transforms the intermediate package to a desired shape with a reduced package size. The intermediate package is allowed to sufficiently cool before being removed from the mold so as to maintain the reduced package size. At least some of the fibers of the housing 210, 310, 410 are now fused to one another to impart a stable shape to the portion of the airbag assembly 10 that is surrounded by the housing 210, 310, 410. In this regard, the final package has a three-dimensional shape defined by the shape of the mold cavity and the undersurface of the upper nest member. This final shape is a stable shape with clearly defined creases that persist after cooling.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element.

It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly for a utility vehicle comprising:
an airtight housing to be mounted to a vehicle structure of the utility vehicle, the airtight housing comprising an uncoated non-woven fabric comprising a plurality of polymeric fibers that prevent natural elements including water, humidity, and dirt from entering the airtight housing;

an inflator to generate inflation gas; and an inflatable airbag cushion disposed within the airtight housing that is in fluid communication with the inflator to receive the inflation gas and deploy from a packaged configuration within the airtight housing to a deployed configuration to protect an occupant of the utility vehicle during a collision event.

2. The inflatable airbag assembly of claim 1, wherein the airtight housing is waterproof.

3. The inflatable airbag assembly of claim 1, wherein the airtight housing is weatherproof.

4. The inflatable airbag assembly of claim 1, wherein the vehicle structure is a seat of the utility vehicle and the airtight housing is configured to be mounted at an outboard side of the seat.

5. The inflatable airbag assembly of claim 4, wherein the airtight housing is configured to be disposed within the seat on the outboard side of the seat.

6. The inflatable airbag assembly of claim 1, wherein the vehicle structure is a roll cage of the utility vehicle.

7. The inflatable airbag assembly of claim 6, wherein band clamps couple the airtight housing to the roll cage.

8. The inflatable airbag assembly of claim 6, wherein the airtight housing is configured to be mounted to a lateral connecting member of the roll cage, and wherein the lateral connecting member is disposed laterally outboard of a seat of the utility vehicle.

9. The inflatable airbag assembly of claim 8, wherein the inflatable airbag cushion is configured to deploy downward from the lateral connecting member and is configured to provide a barrier between a seat and outside of the roll cage.

10. The inflatable airbag assembly of claim 8, wherein the airtight housing is configured to extend along the lateral connecting member extending from a front row of seats to a rear row of seats.

11. The inflatable airbag assembly of claim 6, wherein the airtight housing is mounted to a main roll bar of the roll cage, and wherein the main roll bar is disposed behind a seat of the utility vehicle.

12. The inflatable airbag assembly of claim 1, wherein the inflatable airbag cushion is a torso side airbag.

13. The inflatable airbag assembly of claim 1, wherein the inflatable airbag cushion is a curtain airbag.

14. An inflatable curtain airbag assembly for a utility vehicle comprising:

a housing that is airtight and weatherproof, the housing comprising an uncoated non-woven fabric comprising a plurality of polymeric fibers that prevent natural elements such as water, humidity, and dirt from entering the airtight housing;

a mounting device band clamp to couple the housing to a member of a roll cage of a utility vehicle; and an inflatable airbag cushion disposed within the airtight housing and deployable from the housing.

15. The inflatable airbag assembly of claim 14, wherein the mounting device comprises band clamps that couple the housing to the member of the roll cage.

16. The inflatable airbag assembly of claim 14, wherein the inflatable airbag assembly is configured to be mounted to a lateral connecting member of the roll cage, and wherein the lateral connecting member is disposed laterally outboard of a seat of the utility vehicle.

17. The inflatable airbag assembly of claim 16, wherein the inflatable airbag cushion is configured to deploy downward from the lateral connecting member and is configured to provide a barrier between a seat and outside of the roll cage.

18. The inflatable airbag assembly of claim 16, wherein the airtight housing is configured to be mounted to and extend along the lateral connecting member from a front row of seats to a rear row of seats.

19. The inflatable airbag assembly of claim 14, wherein the housing is configured to be mounted to a main roll bar of the roll cage, and wherein the main roll bar is disposed behind a seat of the utility vehicle.

20. The inflatable airbag assembly of claim 14, wherein the inflatable airbag cushion is a curtain airbag.

* * * * *